(12) United States Patent
Mittal et al.

(10) Patent No.: US 11,463,479 B2
(45) Date of Patent: Oct. 4, 2022

(54) INTERCEPTING NETWORK TRAFFIC

(71) Applicant: Arista Networks, Inc., Santa Clara, CA (US)

(72) Inventors: Anuraag Mittal, Livermore, CA (US); Arun Raton Roy, Burnaby (CA); Thejesh Ajjikariappla Panchappa, Newark, CA (US); Nitin Karkhanis, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 150 days.

(21) Appl. No.: 16/744,134

(22) Filed: Jan. 15, 2020

(65) Prior Publication Data
US 2021/0218774 A1  Jul. 15, 2021

(51) Int. Cl.
*H04L 9/40* (2022.01)

(52) U.S. Cl.
CPC ............ *H04L 63/20* (2013.01); *H04L 63/162* (2013.01); *H04L 63/164* (2013.01)

(58) Field of Classification Search
None
See application file for complete search history.

(56) References Cited

U.S. PATENT DOCUMENTS

| | | | |
|---|---|---|---|
| 7,613,836 B2 * | 11/2009 | Tober | H04L 45/586 370/389 |
| 10,778,721 B1 * | 9/2020 | Holbrook | G06F 16/9017 |
| 2015/0169357 A1 * | 6/2015 | Busaba | G06F 9/526 711/150 |
| 2018/0367393 A1 * | 12/2018 | Harneja | H04L 41/0866 |
| 2019/0140937 A1 * | 5/2019 | Kumar | H04L 45/02 |

* cited by examiner

*Primary Examiner* — Cai Y Chen
(74) *Attorney, Agent, or Firm* — Fountainhead Law Group P.C.

(57) ABSTRACT

Incoming packets in a switch are associated with one or more group identifiers based on content contained in the incoming packets. Rules for processing the corresponding outgoing packets are identified based at least on the group identifiers associated with the incoming packets. Actions associated with matched rules are applied to the outgoing packets.

19 Claims, 8 Drawing Sheets

| VLAN | MAC addr | Group ID bits, 504 | other L2 data fields | |
|---|---|---|---|---|
| VLAN10 | $H1_{MAC}$ | {$b_0$=1, $b_1$=1, $b_2$=1} | - - - | |
| VLAN10 | $H2_{MAC}$ | {1, 0, 1} | - - - | entry, 506 |
| VLAN10 | $H3_{MAC}$ | {0, 0, 0} | - - - | |
| VLAN20 | $H4_{MAC}$ | {0, 0, 0} | - - - | entry, 508 |
| VLAN20 | $H5_{MAC}$ | {0, 0, 1} | - - - | |

L2 table entries

L2 (MAC address) table, 502

| VRF | Dst IP addr | Group ID bits, 514 | other L3 data fields |
|---|---|---|---|
| VRF1 | $H1_{IP}$ | {1, 1, 0} | - - - |
| VRF1 | $H2_{IP}$ | {0, 0, 0} | - - - |
| VRF1 | $H3_{IP}$ | {0, 0, 0} | - - - |
| VRF1 | $H4_{IP}$ | {0, 1, 1} | - - - |
| VRF1 | $H5_{IP}$ | {0, 0, 0} | - - - |
| VRF2 | $H6_{IP}$ | {0, 0, 0} | - - - |

L3 table entries

L3 (routing) table, 512

TCAM rules, 522

| Rule | packet data conditions, 524 ||||||| group metadata conditions, 526 | Action |
|---|---|---|---|---|---|---|---|---|---|
| | Src MAC | Dst MAC | Src IP | Dst IP | Src Port | Dst Port | Protocol | Group Metadata | Action |
| rule a | --- | --- | --- | 192.168.0.1 | --- | --- | --- | --- | <action(s)> |
| rule b | --- | --- | --- | --- | 65535 | --- | --- | --- | <action(s)> |
| ⋮ | | | | | ⋮ | | | | |
| rule j | --- | --- | --- | --- | --- | --- | --- | MASK-j & SrcL2Id | <action(s)> |
| rule k | --- | --- | --- | --- | --- | --- | --- | MASK-k & DstL2Id | <action(s)> |
| rule l | --- | --- | --- | --- | --- | --- | --- | MASK-l & DstL3Id | <action(s)> |
| ⋮ | | | | | ⋮ | | | | |
| rule p | --- | --- | --- | --- | --- | --- | UDP | MASK-p & SrcL2Id | <action(s)> |
| rule q | --- | --- | --- | 192.168.0.1 | --- | --- | --- | MASK-q & DstL3Id | <action(s)> |
| ⋮ | | | | | ⋮ | | | | |
| rule t | --- | --- | --- | --- | --- | --- | --- | MASK-t1 & SrcL2Id && MASK-t2 & DstL2Id | <action(s)> |
| ⋮ | | | | | ⋮ | | | | |

FIG. 5D

MAC list, 702

| MAC addr | Group ID bits |
|---|---|
| $H1_{MAC}$ | {b0, b1, b2} |
| $H2_{MAC}$ | {b0, b1, b2} |
| $H3_{MAC}$ | {b0, b1, b2} |
| $H4_{MAC}$ | {b0, b1, b2} |
| $H5_{MAC}$ | {b0, b1, b2} |
| ⋮ | |

IP list, 704

| IP addr | Group ID bits |
|---|---|
| $H1_{IP}$ | {b0, b1, b2} |
| $H2_{IP}$ | {b0, b1, b2} |
| $H3_{IP}$ | {b0, b1, b2} |
| $H4_{IP}$ | {b0, b1, b2} |
| $H5_{IP}$ | {b0, b1, b2} |
| ⋮ | |

INTERCEPTING NETWORK TRAFFIC

BACKGROUND

Network security typically involves intercepting network traffic to and/or from host machines. Host machines can be identified by their Media Access Control (MAC) addresses for switched traffic and by their Internet Protocol (IP) addresses for routed traffic. A rules database can be provided to identify network traffic and perform actions on identified traffic. Typically, the rules database is implemented in a ternary content-addressable memory (TCAM), referred to as TCAM rules.

Intercepting network traffic to and from a targeted host machine, for example, can involve two rules in the TCAM. One rule can match for the source IP address of the target host machine on incoming packets and another rule can match for the destination IP address of the target host machine on outgoing packets. The intercepted traffic may have any number of actions applied to them including sending them to a service device for further processing.

The capacity for storing rules in a TCAM is generally limited in scale and thus traffic from only a few host machines can be intercepted before the TCAM runs out of space. TCAM sizes are usually on the order to 10K entries or less as compared to other memory resources in the network device. For instance, forwarding tables in the network device employ lower cost memory devices and can have capacities in the range of 100K or so entries.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5D shows an illustrative example of TCAM rules in accordance with the present disclosure.

DETAILED DESCRIPTION

Figure 1A:
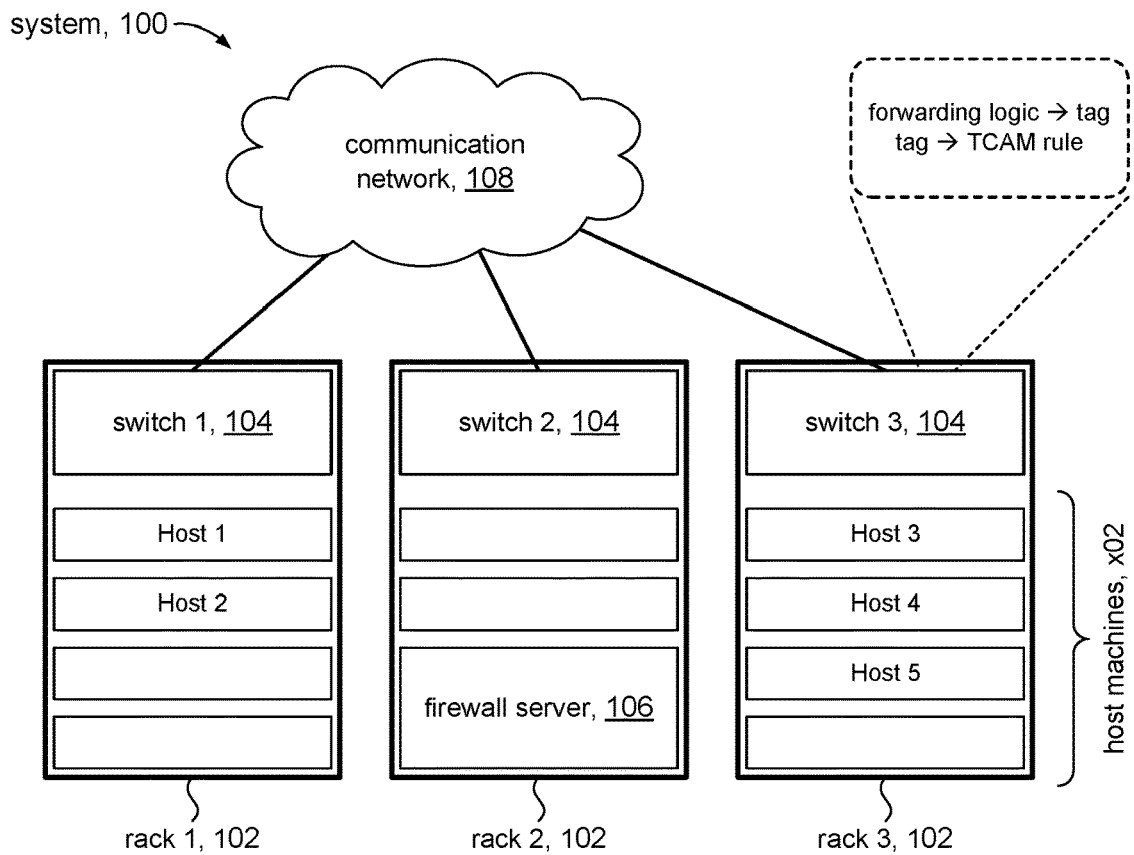
FIG. 1A depicts a system of switches in accordance with the present disclosure.

In a conventional configuration, a TCAM memory can store rules for a number of traffic flows. TCAM rules can match on maskable fields, allowing entire subnets coming into a switch, or all traffic coming into a switch, to be matched and acted on. TCAM rules can match for traffic from or to specific hosts; a rule can be defined for ingress or egress traffic for each host of interest. TCAM rules can match on fields in a packet in order to filter a group of hosts; e.g., a rule can match an application defined in a field in the packet header to filter hosts related to that application. However, as the number of hosts, the number of applications, etc. increases, the TCAM does not remain a viable solution because of the corresponding increase in the number of rules that would be required. TCAM memory is generally expensive to implement in terms of manufacturing cost and power consumption, and so TCAMs generally have limited capacity. Utilizing N TCAM rules to intercept traffic from N host machines or to N host machines can constitute a heavy burden the TCAM memory, especially when N is large.

By comparison, in accordance with the present disclosure, when a packet from a host machine from the group of N host machines is received by a switch, the packet can be tagged with group identifiers during the packet forwarding process. In accordance with the present disclosure, the TCAM rules can match on the group identifiers instead of matching individual hosts in the group. When a packet tagged with the group identifiers enters the TCAM processing stage, the final set of actions on the packet can be determined by one or more of these rules.

Notably, one TCAM rule can be used to perform a given action (e.g., filter, drop, etc.) on outgoing packets from any number N of host machines, where the conventional approach could require N rules. The present disclosure effectively compresses a large group of host machines into a single representation, namely the group identifier, so that one TCAM rule can be used to filter packets from a given group of host machines. This compression allows scaling to large groups of host machines without a corresponding impact on the TCAM resource. Likewise for packets destined to a group of host machines; one TCAM rule can be used to match bridged packets destined for a group of hosts and another TCAM rule can be used to match routed packets destined for that group of hosts.

Details in accordance with some embodiments of various aspects of the present disclosure will now be described. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1A, shows a system adapted in accordance with the present disclosure. In some embodiments, for example, system 100 can include one or more rack-mounted units (racks) 102 of host machines. Each rack 102 can include corresponding switching device (switch) 104, where host machines in a rack are connected to the switch in that rack. Firewall server 106 can be provided in one of the racks. Switches 104 can be configured to communicate over communication network 108 in order to provide communication among the host machines housed in racks 102.

Switches 104 can be configured as Layer 3 switches in order to provide Layer 2 switching and Layer 3 routing. Layer 2 switching operates in the data link layer (Open Systems Interface model, OSI, Layer 2). In some embodiments, for example, switching operations can use Media Access Control (MAC) addresses to determine the forwarding of frames (e.g., Ethernet frames). Layer 3 routing is a routing process that is performed in the network layer (Layer 3) of the OSI model in order to deliver a packet by choosing a suitable path from one network to another, for example, using Internet Protocol (IP) addresses.

One or more of switches 104 can be configured to intercept traffic among the host machines. In some embodiments, for example, intercepted traffic can be directed to firewall server 106. In other embodiments, the intercepted traffic can be processed in other ways; for example, packets may simply be dropped, packets may be directed to destinations in addition to or other than firewall server 106, intercepted packets may simply be logged, and so on.

In accordance with the present disclosure, packets can be intercepted by tagging or otherwise associating the packets with group IDs and then triggering rules based on the group IDs for processing the packets. In some embodiments, for example, a packet can be tagged by the forwarding logic in a switch. For example, the forwarding logic can associate a group ID with the packet. The group ID is associated with the packet but is not otherwise part of the content that comprises the packet. The associated group ID can then be used to identify a rule to determine how to process/forward the packet. Merely for discussion purposes, intercepted packets will be directed to firewall server 106 as an illustrative example for processing tagged packets, but it will be understood that an intercepted packet can be processed in other ways.

Figure 1B:
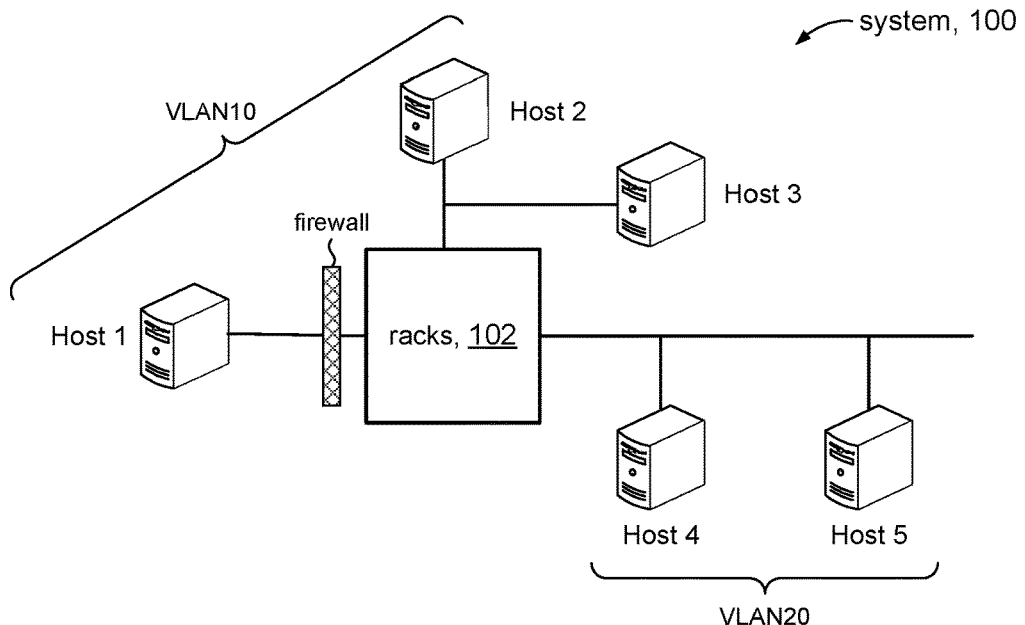
FIG. 1B illustrates an example of a configuration of host machines.

FIG. 1B shows a configuration of system 100 as an illustrative example for discussion purposes to highlight aspects of the present disclosure. The configuration shows that Host 1 is behind a firewall so that traffic to and from Host 1 will be directed to firewall server 106. Host 1 and Host 2 are on the same network (e.g., Host 1 and Host 2 can be bridged). Host 1 and Host 2, for instance, can be on the same virtual local area network (e.g., VLAN10). Host 4 and Host 5 can be deemed to be on a different VLAN (e.g., VLAN20) from Host 1 and Host 2.

Figure 2:
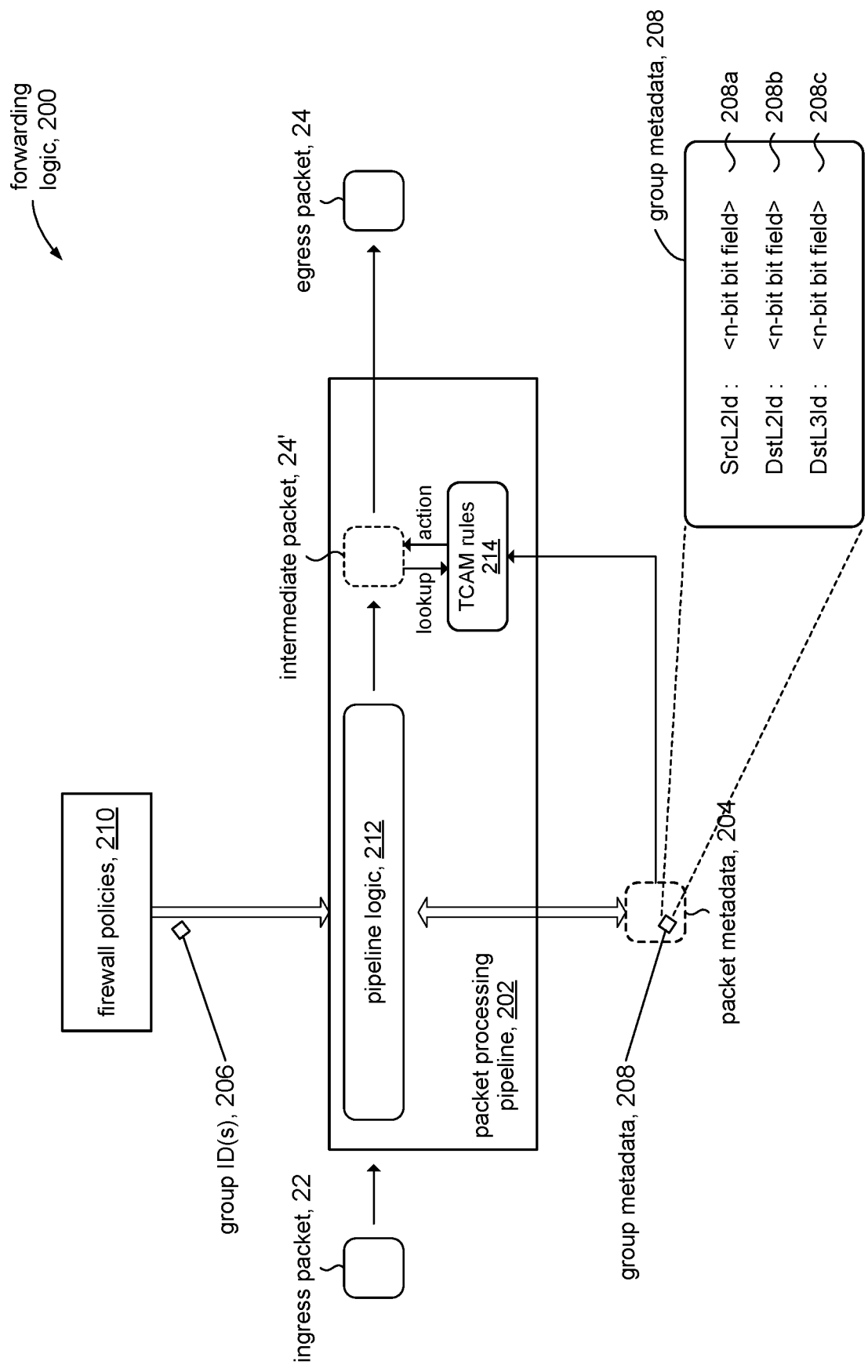
FIG. 2 shows details of forwarding logic in accordance with the present disclosure.

FIG. 2 is a high level diagram depicting an example of forwarding logic 200 that can be used in a switch (e.g., switch 104) in accordance with the present disclosure. Forwarding logic 200 can include packet processing pipeline 202 for processing ingress (incoming) packet 22 to produce egress (outgoing) packet 24.

Each ingress packet 22 can be associated with corresponding packet metadata 204 to facilitate processing of the ingress packet in pipeline 202 to generate egress packet 24. In accordance with the present disclosure, packet metadata 204 is associated with the generated egress packet and can contain group identifiers (IDs) 206 used to identify or otherwise designate the egress packet for interception or other special processing. In some embodiments, group IDs 206 can be defined, managed, and stored in firewall policies 210.

Packet metadata 204 can include group metadata portion 208 to store group IDs 206 as group metadata. Group metadata 208 can be generated based on the content of ingress packet 22 as the ingress packet is processed by pipeline 202. As shown in the figure, in some embodiments, group metadata 208 can include a SrcL2Id bit field 208a, a group metadata bit field 208b, and a DstL3Id bit field 208c. These bit fields are discussed in more detail below. Reference number '208' will be used to herein interchangeably to refer to both the group metadata itself and to the portion of packet metadata 204 that stores the group metadata.

Pipeline 202 can include pipeline logic 212. In accordance with some embodiments of the present disclosure, pipeline logic 212 can copy appropriate group IDs 206 into the bit fields of group metadata 208 during processing of the corresponding ingress packet to produce intermediate egress packet 24'.

It is noted that packet metadata 204 and group metadata portion 208 are associated with the intermediate egress packet, but do not otherwise constitute any of the content in the intermediate egress packet. This distinction is emphasized in FIG. 2, where intermediate egress packet 24' and packet metadata 204 are depicted as separate entities and proceed along separate data paths to a packet classifier.

Pipeline 202 can include a packet classifier. In some embodiments, for example, the packet classifier can comprise rules stored in a ternary content-addressable memory (TCAM), shown in FIG. 2 as TCAM rules 214. Typically, intermediate egress packet 24' maps to an action according to the sequence of stored rules. Each rule specifies a condition(s) over content (data fields) contained in the intermediate egress packet. An action in a matching rule is performed on intermediate egress packet 24' to produce egress packet 24. For example, the action can redirect egress packet 24 from its intended destination; e.g., to a firewall. The action can alter one or more fields in intermediate egress packet 24' to produce egress packet 24. The action can simply log the occurrence of egress packet 24, and so on.

In accordance with the present disclosure, the rules in TCAM 214 can be conditioned based on group metadata 208 that is associated with intermediate egress packet 24' but which are not otherwise contained in the egress packet. This aspect of the present disclosure is discussed below.

Figure 3:
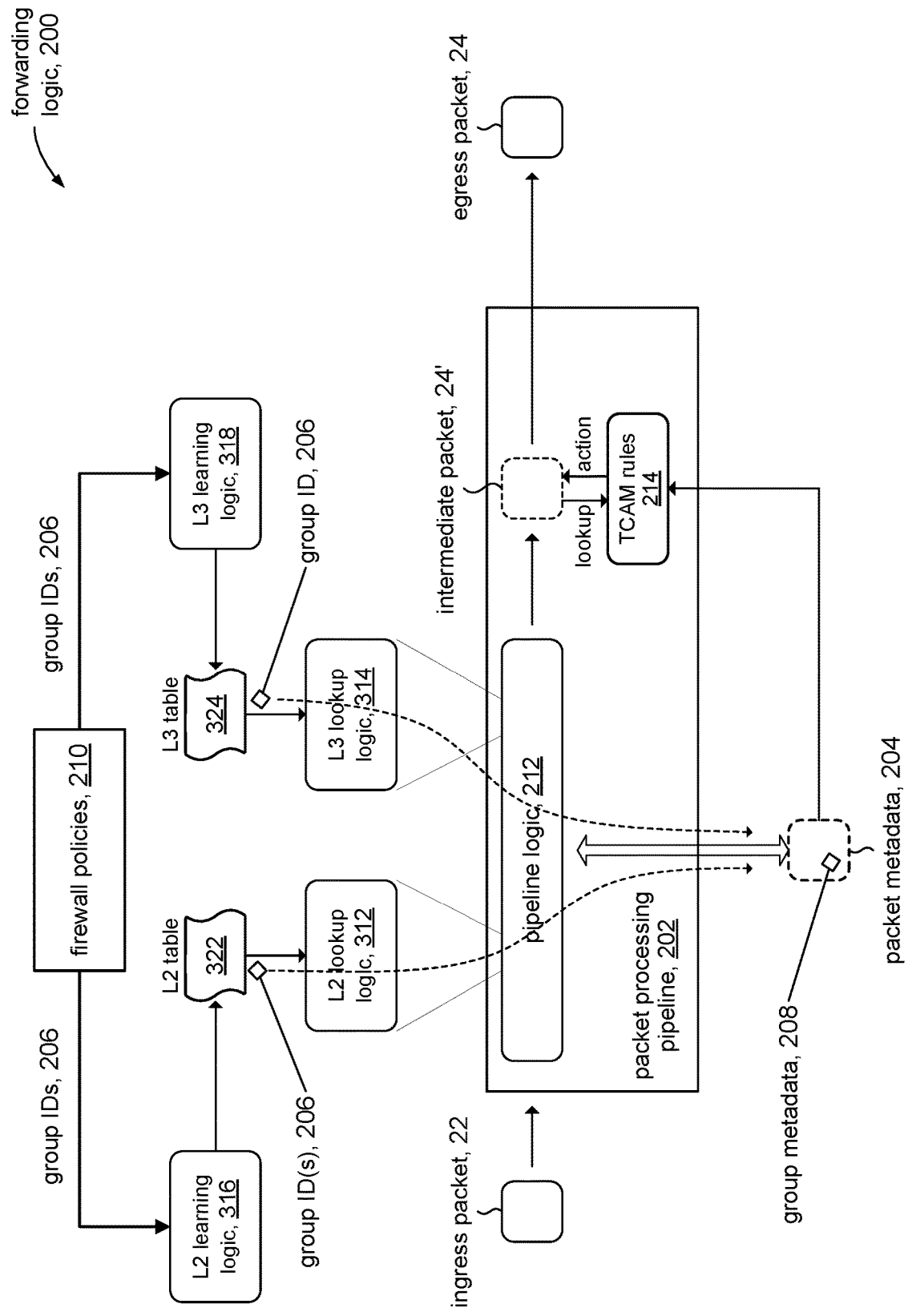
FIG. 3 shows additional details of the forwarding logic shown in FIG. 2 in accordance with the present disclosure.

FIG. 3 is a high level diagram showing additional details for forwarding logic 200 in accordance with some embodiments. As noted above forwarding logic 200 can include packet processing pipeline 202 for processing ingress (incoming) packet 22 to produce egress (outgoing) packet 24. Pipeline logic 212 can include several stages of logic. In some embodiments, for example, pipeline logic 212 can include a parsing logic stage to identify and extract various pieces of data in ingress packet 22 such as headers, addresses, ports, protocols, data fields, and the like. Pipeline logic 212 can include search logic that uses the parsed fields to lookup forwarding information, routing information, and so on. Pipeline logic 212 can include modify logic to modify the ingress packet such as overwriting addresses, inserting data, and so on to produce intermediate egress packet 24'. In some embodiments, the pipeline logic can be in the data plane of the switch, and can include application specific ICs (ASICs) and specialized hardware in order to achieve wire-speed processing and forwarding of ingress packets.

In accordance with the present disclosure, group metadata 208 can be generated based on data contained in ingress packet 22. In some embodiments, group metadata 208 can come from an L2 table, also referred to as a MAC table. For example, pipeline logic 212 can include L2 lookup logic 312 to access L2 table 322 during processing of ingress packet 22. L2 lookup logic 312 can generate group metadata 208 by copying group IDs 206 from the L2 table into the group metadata portion of packet metadata 204 when a matching entry in the L2 table is found. In some embodiments, group metadata 208 can also come from an L3 table, also referred to as a routing table. Pipeline logic 212 can include L3 lookup logic 314 to access L3 table 324 during processing of ingress packet 22. L3 lookup logic 314 can generate group metadata 208 by copying group IDs 206 from the L3 table into the group metadata portion of packet metadata 204 when a matching L3 entry is found.

Forwarding logic 200 can include learning logic to populate the L2 and L3 tables. In some embodiments, for example, forwarding logic 200 can include L2 learning logic 316 to learn MAC addresses from ingress packets and populate L2 table 322 with the learned MAC addresses. In accordance with the present disclosure, L2 learning logic 316 can associate group IDs 206 with some of the learned entries in the L2 table. In some embodiments, for example, group IDs 206 can be stored in one or more L2 entries in accordance with firewall policies 210.

In some embodiments, forwarding logic 200 can further include L3 learning logic 318 to learn IP addresses and populate L3 table 324 with the learned IP addresses. L3 learning logic 318 can be provided in the control plane of the switch. For instance, the control plane can include a processing unit and the L3 learning logic can comprise program code that is executed by the processing unit. In some embodiments, L3 learning logic 318 can use the address resolution protocol (ARP) to learn about IP addresses. In accordance with the present disclosure, L3 learning logic 318 can associate group IDs 206 with some of the learned entries in the L3 table, for example, in accordance with firewall policies 210.

Figure 4:
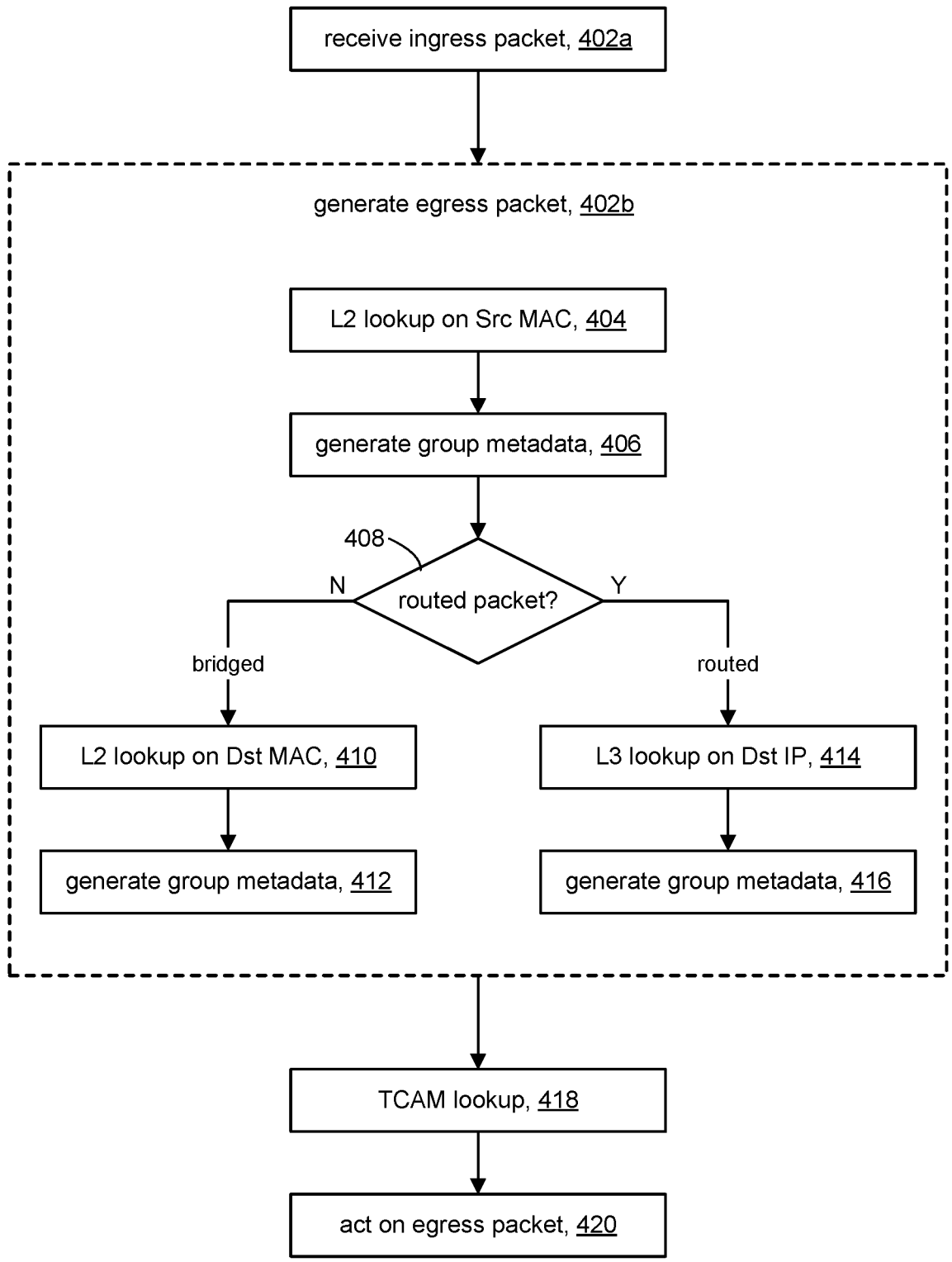
FIG. 4 shows forwarding operations in accordance with the present disclosure.

Referring to FIG. 4, the discussion will now turn to a high level description of processing by a switch for tagging ingress packets in accordance with the present disclosure. In some embodiments, for example, the switch can include forwarding logic 200 (FIG. 3) that is configured to perform operations in accordance with FIG. 4.

At operation 402a, the switch can receive an ingress (incoming) packet (e.g., 22, FIG. 3). For discussion purposes, the ingress packet can be an Ethernet frame having data fields including a source MAC address, a destination MAC address, a payload portion, and a checksum field. Further for discussion purposes, consider a use case based on FIGS. 1A, 1B where switch 1 receives a packet from Host 1. Accordingly, the source MAC address in the received ingress packet would be the MAC address of Host 1 (e.g., $H1_{MAC}$).

At operation 402b, the switch can generate an egress (outgoing) packet (e.g., 24, FIG. 3) based on the received ingress packet. As shown in FIG. 4, in accordance with the present disclosure, operations for generating an egress packet can include operations for generating the group metadata that is associated with the egress packet based on information contained in the received ingress packet. These operations will now be described.

Figures 5A, 5B, 5C:
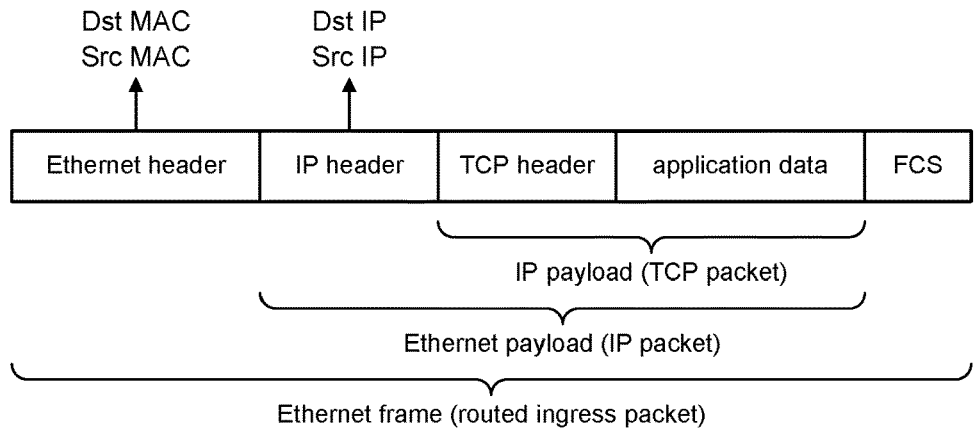
FIG. 5A shows an illustrative example of a MAC table in accordance with the present disclosure.
FIG. 5B illustrates an example of an Ethernet frame.
FIG. 5C shows an illustrative example of a routing table in accordance with the present disclosure.

At operation 404, the switch can perform an L2 lookup in the L2 (MAC address) table (e.g., 322, FIG. 3) using the source MAC address contained in the received ingress packet to access an L2 table entry. Referring for a moment to FIG. 5A, L2 table 502 is an illustrative example of an L2 table in accordance with some embodiments. A lookup in the L2 table can be keyed on the source MAC address and the VLAN contained in the ingress packet to identify an L2 table entry. If the source MAC address is not contained in the L2 table, then source MAC learning can performed. Source MAC learning in accordance with the present disclosure is discussed below. For discussion purposes, however, suppose that the L2 table has learned the source MAC address contained in the received ingress packet.

At operation 406, the switch can generate group metadata (e.g., 208, FIG. 2) based on information contained in an accessed L2 table entry associated with the source MAC address of the ingress packet. Referring again to FIG. 5A, for a moment, in accordance with some embodiments, each entry in L2 table 502 can include Group ID bits 504 in addition to typical L2 data fields such as ingress port, VLAN ID, and so on. In some embodiments, the group metadata can be based on Group ID bits 504 stored in an L2 table entry. In some embodiments, for example, because the MAC address is the source MAC address of the ingress packet, group metadata can be generated by copying the Group ID bits from the L2 table entry associated with the source MAC address into the SrcL2Id data field (208a, FIG. 2) in the group metadata portion of the packet metadata. Group ID bits 504 are discussed in more detail below.

At operation 408, the switch can determine whether the ingress packet is a routed packet or a bridged packet. A routed packet is a packet that is forwarded from one network to another different network, including networks that are physical LANs and virtual LANs (VLANs). On the other hand, a bridged packet is a packet that is forwarded within the same network. Referring to FIG. 1B, for example, a packet from Host 1 to Host 4 can be considered to be a routed packet because the packet is being forwarded from one network (e.g., VLAN10) to another network (e.g., VLAN20). On the other hand, a packet from Host 1 to Host 2 can be considered to be a bridged packet because the host machines are on the same network, namely VLAN10.

In some embodiments, the determination between a routed packet and a bridged packet can be made based on the destination MAC address in the received ingress packet. In the case of a bridged packet, the destination MAC address in the received ingress packet will be the MAC address of the destination host machine. Referring to FIG. 1B, for example, if Host 1 sends a packet to Host 2, the destination MAC address in the ingress packet received by switch 1 would be the MAC address of destination host machine Host 2 (e.g., $H2_{MAC}$). In the case of a routed packet, the destination MAC address in the received ingress packet will be the MAC address of the switch that receives the ingress packet. Referring to FIG. 1B, for example, if Host 1 (on VLAN10) sends a packet to Host 4 (on VLAN20), the destination MAC address in the packet sent by Host 1 to switch 1 would be the MAC address of the switch (e.g., $Sw1_{MAC}$). Accordingly, the determination between a routed packet and a bridged packet can be made based on whether or not the destination MAC address matches (equals) the MAC address of the switch. In the case of a bridged packet, processing can continue with operation 410. In the case of a routed packet, processing can continue with operation 414.

Bridged Packet

At operation 410, the switch can process a bridged ingress packet to produce an egress packet. As explained above, the destination MAC address in a bridged ingress packet will be the MAC address of the destination host machine. Processing of a bridged ingress packet by the switch includes performing an L2 lookup in the L2 (MAC address) table using the destination MAC address and the VLAN to identify the egress port on the switch for forwarding the egress packet.

At operation 412, the switch can generate additional group metadata based on information contained in an accessed L2 table entry associated with the destination MAC address of the ingress packet. As noted above, the group metadata can be based on Group ID bits 504 stored in an L2 table entry. In some embodiments, for example, because the MAC address is the destination MAC address of the ingress packet, additional group metadata can be generated by copying the Group ID bits from the L2 table entry associated with the destination MAC address into the DstL2Id data field (208b, FIG. 2) of the group metadata portion of the packet metadata. Processing can continue with operation 418.

Routed Packet

At operation 414, the switch can process a routed ingress packet to produce an egress packet. Processing of a routed ingress packet by the switch includes performing an L3 lookup in the L3 (routing) table (e.g., 324, FIG. 3) using the destination IP address contained in the ingress packet and the virtual routing and forwarding (VRF) information obtained from the switch. Referring to FIG. 5B, for example, the Ethernet frame comprising the ingress packet includes an Ethernet header and a payload portion. The Ethernet header includes the source and destination MAC addresses. The payload portion of the Ethernet frame encapsulates an IP packet, which in turn comprises an IP header and an IP payload. The destination IP address can be found in the IP header of the IP packet, which can be used as a key in the L3 table. Referring to FIG. 5C, for example, L3 table 512 is an illustrative example of an L3 table in accordance with some embodiments. The destination IP address and VRF information can be used to do a lookup in L3 table 512.

At operation 416, the switch can generate additional group metadata based on information contained in the accessed L3 table entry associated with the destination IP address of the ingress packet. Referring again to FIG. 5C for a moment, in accordance with some embodiments, L3 table 512 can include Group ID bits 514, in addition to other L3 data fields such as a next hop IP to which the egress packet will be forwarded, an egress port on which the egress port will be sent, routing metrics, and so on. In some embodiments, the additional group metadata can be based on Group ID bits 514 stored in an L3 table entry. In some embodiments, for example, because the IP address is the destination IP address of the ingress packet, additional group metadata can be generated by copying the Group ID bits from the L3 table entry associated with the destination IP address into the DstL3Id data field (208c, FIG. 2) in the group metadata portion of the packet metadata. Processing can continue with operation 418.

TCAM Rules

At operation 418, the switch can perform a TCAM lookup to identify a TCAM rule, if any, to be applied to the egress packet. Generally, each TCAM rule includes one or more conditions based on data contained in the egress packet. Referring to FIG. 5D, for example, TCAM rules 522 can include match conditions 524 based on data contained in the egress packet, such as source and destination MAC addresses, source and destination IP addresses, source and destination ports, protocol type, and the like. For instance, a rule (e.g., "rule a") may be conditioned on an egress packet matching a specific destination IP address (e.g., 192.168.0.1). Another rule (e.g., "rule b") may be conditioned on the source port in an egress packet matching a certain port # (e.g., 65535), and so on. When the condition of a TCAM rule is satisfied, the associated action or actions are applied to the egress packet. Rules in the TCAM are searched in a sequential order; when multiple rules match, the first rule that is matched can be selected and applied to the egress packet.

In accordance with the present disclosure, TCAM rules 522 can further include match conditions 526 based on data (e.g., group metadata) that is associated with the egress packet but which does not otherwise constitute the data that comprise the egress packet. In accordance with the present disclosure, the TCAM lookup can be keyed off of the SrcL2Id, DstL2Id, and DstL3Id data fields in the group metadata portion of the associated packet metadata. This aspect of the present disclosure is discussed in more detail below.

At operation 420, the switch can apply the action(s) that are associated with a matched rule to the egress packet. Actions can include dropping the egress packet, re-directing the egress packet to a different destination (e.g., a firewall server), modifying one or more fields in the egress packet, logging the egress packet, and so on.

The discussion will now turn to a more detailed discussion of group IDs (e.g., 206, FIG. 2) and Group ID bits shown in FIGS. 5A and 5B. In accordance with the present disclosure, a group of host machines in a network may be deemed "interesting." In some embodiments, for example, a host machine can be identified as being of interest in that the host may pose issues concerning security, privacy, data sensitivity, risk, and so on. More generally, any host machine can be deemed interesting for any reason. In some embodiments, one or more groups of host machines can be defined. Group ID(s) 206 shown in FIG. 2, for example, define one or more such groups.

Referring to FIG. 5A, for instance, as explained above each L2 table entry can include Group ID bits 504. As the name suggests, Group ID bits 504 comprise bits that identify one or more groups with which the MAC address is associated. Because the MAC address in an L2 table entry identifies a host machine, the Group ID bits in an L2 table entry serve to identify one or more groups of host machines of interest. For example, host machines in the sales group in an enterprise may constitute a group of interested host machines, host machines in the finance group may constitute another group of interested host machines, and so on. Referring to FIG. 5C, Group ID bits 514 likewise identify one or more groups with which the IP address is associated. Because the IP address in an L3 table entry identifies a destination host machine, the Group ID bits in an L3 table entry associated with an ingress packet to a given host machine identify which group or groups with which host machine is associated.

Group ID bits 504, 514 can be N-bit data fields, where N indicates the number of groups and can be any suitable value. In some embodiments, each bit corresponds to a group; so an N-bit Group ID corresponds to N respective groups. In other embodiments, the Group ID bits can represent an encoded value so that an N-bit Group ID, for example, can encode $2^{N-1}$ groups. Merely for purposes of explanation, and without loss of generality, the discussion will use N=3 where each bit corresponds to a group; for example, bit 0 corresponds to one group (e.g., Group A host machines), bit 1 corresponds to another group (e.g., Group B host machines), and bit 2 corresponds to yet another group (e.g., Group C host machines). FIG. 5A, for example, shows that Host 1 ($H1_{MAC}$) is associated with Groups A, B, and C. Host 2 ($H2_{MAC}$) is associated with Groups A and C, and Host 5 ($H5_{MAC}$) is associated only with Group C. Hosts 3 and 4 are not associated with any groups; their Group ID bits are all '0'. The number and nature of groups are beyond the scope of the present disclosure. The setting up of groups is generally a matter of the policies in an enterprise; e.g., a system administrator can define the number of groups and decide what each group represents in accordance with such policies.

As explained above, the Group ID bits in an L2 or L3 table entry are used to tag an ingress packet. The Group ID bits are copied into appropriate data fields SrcL2Id, DstL2Id, DstL3Id in the group metadata portion of the packet metadata associated with the ingress packet. Group ID bits in the SrcL2Id data field indicates that the sender (source host machine) of the ingress packet belongs to the group(s) whose bits are set. Group ID bits in the DstL2Id data field or the DstL3Id data field indicates that the receiver (destination host machine) of the ingress packet belongs to the group(s) whose bits are set.

The foregoing has described the mechanics of tagging packets with group metadata in accordance with the present disclosure. The description will now turn to a discussion in connection with FIG. 5D of how the tagging mechanics in accordance with the present disclosure can be used to intercept certain network traffic.

As explained above, in accordance with the present disclosure, group metadata (e.g., 208, FIG. 2) can be associated with egress packets for interception or other special processing. An enterprise, for example, may want to prevent unauthorized access to its computers, to prevent users in the enterprise from accessing potentially unsecured private networks connected to the internet, and so on. As mentioned above certain host machines can be identified as being of interest in that they represent issues concerning security, privacy, data sensitivity, risk, and so on; more generally, any host machine can be deemed interesting for any reason. In accordance with the present disclosure, group metadata can be used to identify traffic related to these "interesting" host machines based on the constituent data fields SrcL2Id, DstL2Id, and DstL3Id in the group metadata. For example, the Group ID bits in the SrcL2Id data field can be used to identify and intercept packets that were sent from host machines associated with a group whose corresponding bit is set, and likewise the DstL2Id and DstL3Id data fields can be used to identify and intercept packets that are destined for a host machine associated with a group whose corresponding bit is set. The DstL2 group ID can be used to identify bridged packets destined for host machines of interest, while the DstL3 group ID can be used to identify routed packets.

FIG. 5D shows examples of TCAM rules 522 that can match on data fields SrcL2Id, DstL2Id, and DstL3Id. Each rule has a match condition 526 that identifies one or more groups of host machine with which the rule is associated. Consider "rule j" for example, which is conditioned on the match condition MASK-j & SrcL2Id. This rule will match on an egress packet whose associated packet metadata contains a SrcL2Id data field that satisfies the condition: MASK-j & SrcL2Id. The mask MASK-j, referred to as a group selection mask, is a bit mask to identify the group ID bit(s) of interest. Using the convention defined above, where bit 0 corresponds to Group A host machines, bit 1 corresponds to Group B host machines, and bit 2 corresponds to Group C host machines, suppose an egress packet contains the data field SrcL2Id={$b_0=0$, $b_1=1$, $b_2=1$} in its group metadata. This indicates that the sending host machine belongs to two groups: group B corresponding to bit $b_1$ and group C corresponding to bit $b_2$. In order to target traffic from host machines in group B, then group selection MASK-j can be set to '010' and logically AND'd with SrcL2Id. If the rule is intended to target traffic from host machines in group C, then MASK-j can be set to '001'. If the rule is intended to target traffic from host machines in group B or in group C, then MASK-j can be set to '011'. If MASK-j is set to '100', this will not trigger "rule j" for an egress packet associated with a SrcL2Id={$b_0=0$, $b_1=1$, $b_2=1$}.

Rules likewise can match on receiving host machines. For instance, "rule k" will match on traffic that destined to host machines that belong to one or more groups as determined by the MASK-k group selection mask.

Rules can target host machines at both endpoints, source and destination. For example, "rule t" specifies a match condition on the sender of an egress packet and a match condition on the destination of the egress packet. Separate group selection masks MASK-t1 and MASK-t2 can be used to mask respective data fields SrcL2Id and DstL2Id in the group metadata associated with a given egress packet. If MASK-t1 is set to '001' and mask-t2 is set to '101', these masks will target an egress sent from a host machine that belongs to the group associated with bit $b_2$ in the SrcL2Id data field and destined to a host machine that belongs to one of the groups associated with bits $b_0$ and $b_2$ in the DstL2Id data field.

Figures 6, 7:
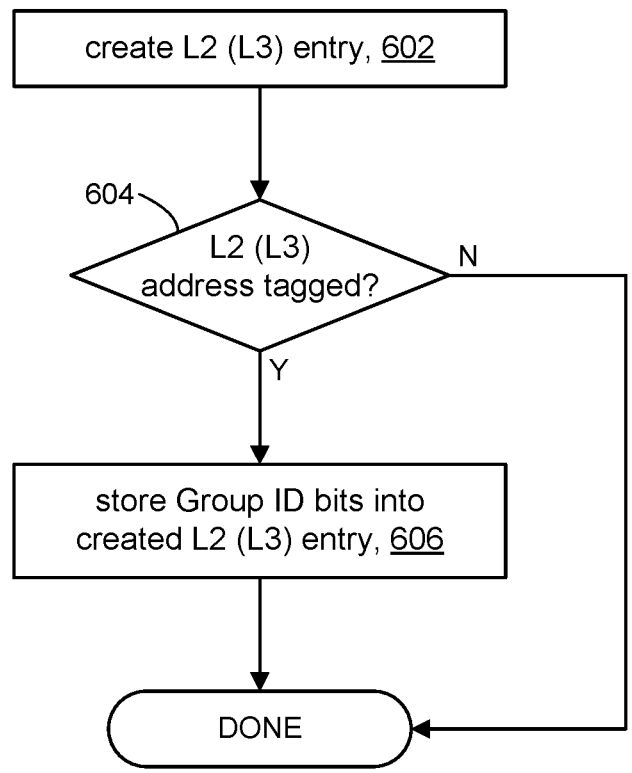
FIG. 6 shows MAC learning and IP learning operations in accordance with the present disclosure.
FIG. 7 shows an example of a MAC list and an IP list in accordance with some embodiments of the present disclosure.

Referring now to FIG. 6, the discussion will turn to a high level description of processing by a switch for learning MAC addresses and IP addresses in accordance with the present disclosure. In some embodiments, for example, the switch can include a general processor (e.g., 808, FIG. 8) and computer executable software, which when executed by the general processor, can cause the general processor to perform operations in accordance with FIG. 6 to perform IP learning. The switch can include a packet processor (e.g., 812a, FIG. 8) that is configured to perform operations in accordance with FIG. 6 to perform MAC learning.

At operation 602, the switch can be triggered to create an entry in the L2 (MAC address) table (e.g., 322, FIG. 3) or the L3 (routing) table (e.g., 324, FIG. 3). In the case of the L2 table, source MAC learning can be triggered when the source MAC address in a bridged ingress packet is not found in the L2 table. Referring to FIG. 5A, for example, an entry can be created in the L2 table, by storing the source MAC address in the MAC address data field of the created entry, and storing an identifier of the port (interface) on the switch on which the ingress packet was received in one of the other L2 data fields. In the case of the L3 table, IP learning can be triggered when the destination IP address (e.g., FIG. 5B) in a routed ingress packet is not found in the L3 table. In some embodiments, IP learning can be based on ARP to find out the MAC address of the destination host machine device given its destination IP address, which can then be stored in the L3 table.

At operation 604, the switch can determine whether the MAC or IP address associated with the created L2 or L3 entry is tagged for interception. As explained above, inbound and/or outbound network traffic on host machines of interest can be intercepted. Data packets to and from such host machines can be identified by the host machines' MAC addresses and/or IP addresses contained in the data packets.

At operation 606, the switch can store Group ID bits 504 or 514 respectively into the created L2 or L3 entry. For instance, when an L2 entry is created for a source MAC address, the switch can search a MAC list (702, FIG. 7) of MAC addresses and corresponding Group ID bits. If the MAC address is found in the MAC list, the corresponding Group ID bits can be copied from the MAC list to the created L2 entry. Likewise, when an L3 entry is created for a destination IP address, the switch can search an IP list (704, FIG. 7) of IP addresses and corresponding Group ID bits. If the IP address is in the IP list, the switch can store the corresponding Group ID bits from the IP list into the created L3 entry.

Referring to FIG. 7, in some embodiments, lists of host machines of interest can be used to populate Group ID bits in the L2 table (FIG. 5A) and L3 tables (FIG. 5C). For example, MAC list 702 and IP list 704 can be maintained in order to determine whether a MAC address or IP address is tagged for interception. These lists, for example, can be maintained in accordance with the firewall policies of the system or other security policies. When a host machine is deemed interesting from the point of view of security or for any other reason, that host machine's MAC address can be entered into MAC list 702 for the purpose of intercepting bridged traffic involving the host machine, and likewise its IP address can be entered into IP list 704 for the purpose of intercepting routed traffic involving the host machine. MAC list 702 and IP list 704 can store Group ID bits for each host machine, with corresponding bits being set for each group that the host machine is to be associated with.

The discussion will now turn to an example to illustrate how the present disclosure can improve the utilization of memory in a switch. Suppose a group of host machines Host 1-Host N are deemed of interest and we want to intercept outgoing packets from each of the N host machines; for example, we may want to drop the packets or redirect them to a firewall.

In a conventional configuration, the TCAM memory can include N rules, one rule for each of the N host machines. Each rule would specify the source MAC address of a host machine and an appropriate action or actions. When N is small, this conventional approach may be suitable, but for large N (e.g., N can be in the thousands) the conventional approach may not be suitable. TCAM memory is generally expensive to implement in terms of manufacturing cost and power consumption. TCAM memory is typically considered a limited resource that should be used efficiently. Utilizing N TCAM rules to intercept traffic from N host machines can constitute a heavy burden the TCAM memory, especially when N is large.

By comparison, in accordance with the present disclosure, the N host machines of interest can be associated with a group, call it Group I. For example, bit $b_0$ in the Group ID bits can be assigned to Group I. A system administrator can identify each of the N host machines by adding their MAC addresses to the MAC list 702 shown in FIG. 7 and storing (associating) {1,0,0} as the Group ID bits with each MAC address. Over time, as source MAC learning takes place, the L2 table will become populated with the MAC addresses of the N host machines along with the Group ID bits {1,0,0}. When one of the N host machines transmits a packet, the SrcL2Id data field in the group metadata portion of packet metadata associated with the packet will be tagged with the SrcL2Id group ID bits during the packet forwarding process described above. A TCAM rule that masks for bit b0 in the SrcL2Id data field can then be triggered to take action on the packet.

Because the same TCAM rule is triggered for traffic sent by any host machine among the N host machines, only one rule is required for the N host machines. The present disclosure can use a single TCAM rule to intercept outgoing packets from any number of host machines as compared to the conventional approach, thus significantly improving the utilization of a limited memory resource such as the TCAM. The present disclosure effectively compresses a large group of host machines into a single representation, namely the group ID, so that a single TCAM rule can be applied to the entire group of host machines. This compression allows scaling to large groups of host machines without impacting the TCAM resource; only one TCAM rule is needed to intercept outgoing traffic, whether from one host machine or from hundreds of host machines.

A similar discussion applies to tagging host machines as destinations. A system administrator can specify a group of destination host machines for interception in the MAC list and in the IP list shown in FIG. 7. In the case of a destination host machine, the DstL2 and DstL3 group IDs would be used. Any number of N destination host machines can be listed in the MAC list and the IP list. When the switch processes a bridged or routed packet that is destined for one of the listed host machines, the packet will be tagged with the DstL2 or DstL3 group ID. Referring again to the TCAM rules in FIG. 5D as an example, the tagged packet will match either "rule m" or "rule n." One TCAM rule can be used to intercept bridged packets destined for any number of host machines. Likewise, one TCAM rule can be used to intercept routed packets destined for any number of host machines.

Additional Qualifiers

In some embodiments, the TCAM rule can be conditioned on data comprising the egress packet in addition to the group ID. Referring to FIG. 5D, for example, "rule r" specifies an additional qualifier, namely the protocol type. This rule can be matched when the group ID associated with the egress packet is SrcL2 and a packet type in the egress packet specifies the UDP protocol type. Likewise, "rule s" can be triggered when an egress packet is tagged with the DstL3 group ID and the egress packet includes a destination IP address of "192.168.0.1".

In some embodiments, additional group IDs can be defined to define separate groups of host machines. The SrcL2 group ID, for example, corresponds to one group of host machines, and serves to tag packets from that group of host machines. In some embodiments, a SrcL2A group ID can be defined to correspond to a group of host machines separate from the group associated with SrcL2. Likewise, a corresponding DstL2A group ID and a DstL3A group ID can be defined along with the Srcl2A group. Using the bit field data format, the bit field would include an additional bit corresponding to each additional group ID. In the TCAM rules (e.g., FIG. 5D) one set of actions can be associated with rules that are triggered by the SrcL2, DstL2, and DstL3 group IDs, such as "rule l", "rule m", and "rule n" for instance. A different set of actions can be associated with rules that are triggered by the SrcL2A, DstL2A, and DstL3A group IDs, such as "rule u", "rule v", and "rule w" for instance. This allows for different groups of host machines to be treated differently. For example, packets from one group of host machines can simply be dropped, while packets from another group of host machines can be forwarded to a firewall, and so on.

Figure 8:
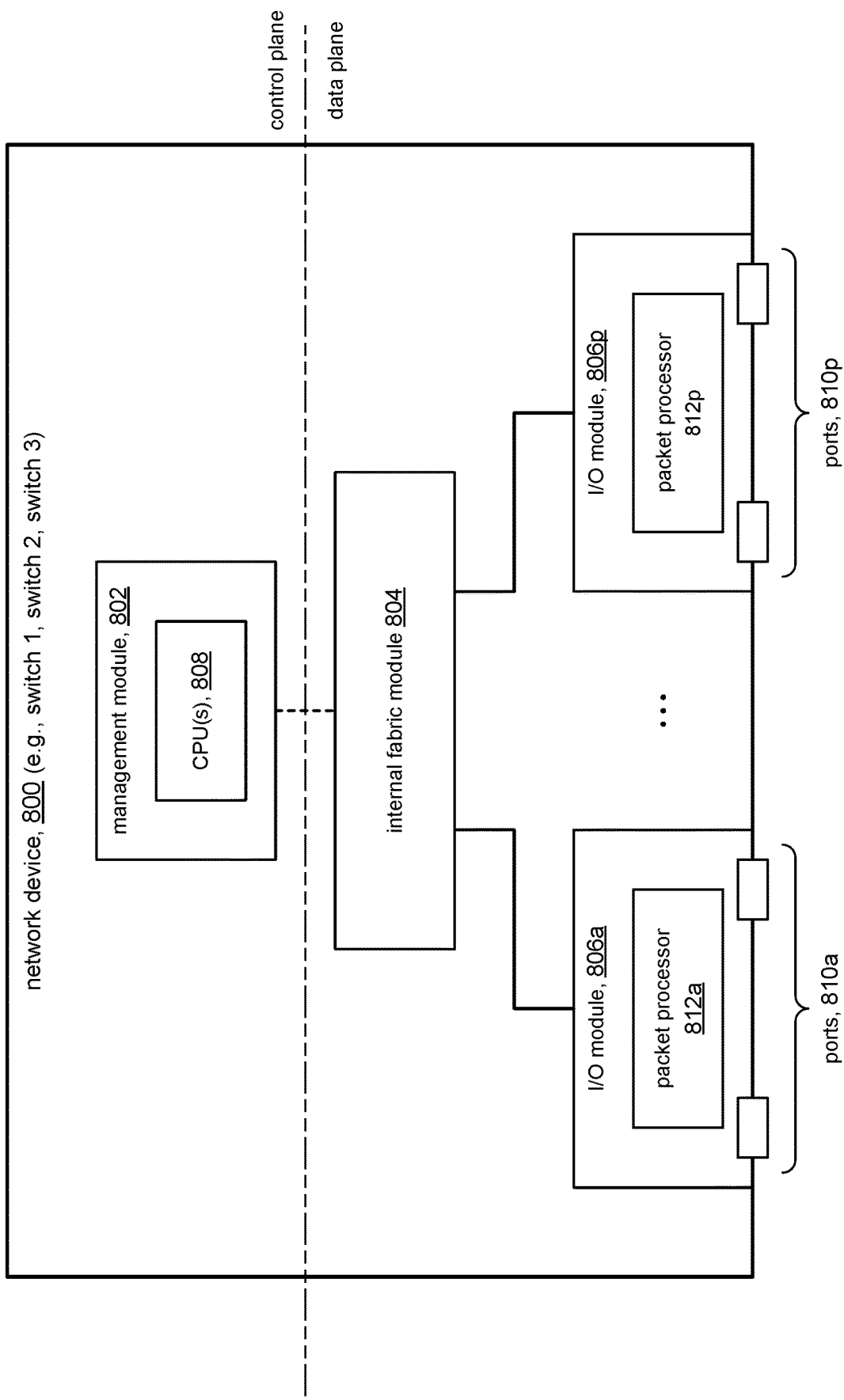
FIG. 8 illustrates details of a network device that can be adapted in accordance with the present disclosure.

FIG. 8 depicts an example of a network device 800 in accordance with some embodiments of the present disclosure. In some embodiments, network device 800 can be a switch (e.g., 104, FIG. 1). As shown, network device 800 includes a management module 802, an internal fabric module 804, and a number of I/O modules 806a-806p. Management module 802 includes the control plane (also referred to as control layer) of network device 800 and can include one or more management CPUs 808 for managing and controlling operation of the device. Each management CPU 808 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such a routing protocols, spanning tree, and the like.

Internal fabric module 804 and I/O modules 806a-806p collectively represent the data plane of network device 800 (also referred to as data layer, forwarding plane, etc.). Internal fabric module 804 is configured to interconnect the various other modules of network device 800. Each I/O module 806a-806p includes one or more input/output ports 810a-810p that are used by network device 800 to send and receive network packets. Each I/O module 806a-806p can also include a packet processor 812a-812p. Each packet processor 812a-812p can comprise a hardware processing component (e.g., comprising an ASIC, FPGA, content-addressable memory, and the like) that is configured to make wire speed decisions on how to handle incoming (ingress) and outgoing (egress) network packets. As will become clear, in accordance with some embodiments some aspects of the present disclosure are performed wholly within the data plane.

It should be appreciated that network device 800 is illustrative and many other configurations having more or fewer components than shown in FIG. 8 are possible.

Further Examples

In accordance with the present disclosure, a method can include receiving an incoming data packet; determining one or more group identifiers (IDs) based on content in the incoming data packet, the group IDs identifying one or more groups of host machines with which the incoming data packet is associated; identifying a rule, from a plurality of rules, based on the one or more group IDs; and performing an action associated with the identified rule on an outgoing data packet generated from the incoming data packet, wherein the action that is performed can be based on the one or more groups of host machines with which the incoming data packet is associated.

In some embodiments, the one or more group IDs can be based on addressing information contained in the incoming data packet.

In some embodiments, the one or more group IDs can be based on group information from one or more packet forwarding tables. The one or more packet forwarding tables can include a MAC table. The one or more packet forwarding tables can include a routing table.

In some embodiments, the one or more group IDs can be based at least on a source MAC address in the incoming data packet.

In some embodiments, the one or more group IDs can be based at least on a destination MAC address in the incoming data packet.

In some embodiments, the one or more group IDs can be based at least on a destination IP address in the incoming data packet.

In some embodiments, identifying a rule can be based on information contained in the outgoing data packet in addition to the one or more group IDs associated with the outgoing data packet.

In accordance with the present disclosure, a network device can include one or more processors. The one or more processors can be configured to receive an incoming data packet; identify at least one group of host machines with which the incoming data packet is associated; identify a rule, from a plurality of rules, based on the at least one group of host machines with which the incoming data packet is associated; and perform an action that is associated with the identified rule on an outgoing data packet generated from the incoming data packet, wherein the action that is performed is based at least on the at least one group of host machines with which the incoming data packet is associated.

In some embodiments, the at least one group of host machines can be based on addressing information contained in the incoming data packet. The at least one group of host machines can be based at least on a source MAC address, a destination MAC address, or a destination IP address in the incoming data packet.

In some embodiments, the one or more processors can be further configured to identify a rule based on information contained in the outgoing data packet in addition to the at least one group of host machines with which the incoming data packet is associated.

In some embodiments, the one or more processors can be further configured to determine one or more group identifiers (IDs) based on content in the incoming data packet, the one or more group IDs identifying the at least one group of host machines with which the incoming data packet is associated.

In accordance with the present disclosure, a network device can include a memory having stored therein a plurality of rules, each of the plurality of rules associated with one or more groups of host machines; and one or more processors configured to process an egress packet according to one or more actions associated with a rule selected from among the plurality of rules based on a comparison between the one or more groups of host machines associated with the rules and one or more groups of host machines associated with the egress packet.

In some embodiments, a rule that is associated with a first group of host machines matches any egress packet that is also associated with the first group of host machines.

In some embodiments, the network device can further include a group identifier (ID) memory having stored therein data that identifies the one or more groups of host machines associated with the egress packet, wherein each of the plurality of rules is associated with a group mask, wherein a rule is selected from among the plurality of rules by combining the rule's group mask with data in the group ID memory.

In some embodiments, data in the group ID memory can be determined based on addressing information contained in an ingress packet, wherein the egress packet is generated from the ingress packet. The network device can further include one or more packet forwarding tables used to generate the egress packet from the ingress packet, wherein the data for the group ID memory is obtained from the one or more packet forwarding tables. The information can be a MAC address or an IP address in the ingress packet.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
receiving an incoming data packet;
determining a group identifier (ID) based on content in the incoming data packet, wherein the group ID comprises a plurality of bits whose bits correspond to different groups of host machines,
wherein the content in the incoming data packet does not include the group ID, wherein the group ID identifies groups of host machines with which the incoming data packet is associated;
identifying a rule, from a plurality of rules, based on the group ID; and
performing an action associated with the identified rule on an outgoing data packet generated from the incoming data packet, wherein the action that is performed is based on the one or more groups of host machines with which the incoming data packet is associated.

2. The method of claim 1, wherein the one or more group IDs is based on addressing information contained in the incoming data packet.

3. The method of claim 1, wherein the one or more group IDs is based on group information from one or more packet forwarding tables.

4. The method of claim 3, wherein the one or more packet forwarding tables includes a MAC table.

5. The method of claim 3, wherein the one or more packet forwarding tables includes a routing table.

6. The method of claim 1, wherein the one or more group IDs is based at least on a source MAC address in the incoming data packet.

7. The method of claim 1, wherein the one or more group IDs is based at least on a destination MAC address in the incoming data packet.

8. The method of claim 1, wherein the one or more group IDs is based at least on a destination IP address in the incoming data packet.

9. The method of claim 1, wherein identifying a rule is based on information contained in the outgoing data packet in addition to the one or more group IDs associated with the outgoing data packet.

10. A network device comprising one or more processors, the one or more processors configured to:
receive an incoming data packet;
identify at least one group of host machines with which the incoming data packet is associated, including determining a group identifier (ID) based on content in the incoming data packet,
wherein determining the group identifier (ID) is based on content in the incoming data packet, wherein the group ID comprises a plurality of bits whose bits correspond to different groups of host machines,
wherein the group ID is not included in the content in the incoming data packet, wherein the group ID identifies groups of host machines with which the incoming data packet is associated;
identify a rule, from a plurality of rules, using the group ID; and
perform an action that is associated with the identified rule on an outgoing data packet generated from the incoming data packet, wherein the action that is performed is based at least on the at least one group of host machines with which the incoming data packet is associated.

11. The network device of claim 10, wherein the at least one group of host machines is based on addressing information contained in the incoming data packet.

12. The network device of claim 11, wherein the at least one group of host machines is based at least on a source MAC address, a destination MAC address, or a destination IP address in the incoming data packet.

13. The network device of claim 10, wherein the one or more processors are further configured to identify a rule based on information contained in the outgoing data packet in addition to the at least one group of host machines with which the incoming data packet is associated.

14. A network device comprising:
a memory having stored therein a plurality of rules, each of the plurality of rules having a group identifier (ID), the group ID comprising a plurality of bits whose bits correspond to different groups of host machines; and
one or more processors configured to process an egress packet according to one or more actions associated with a rule selected from among the plurality of rules based on a match between the group ID in each of the rules and a group ID associated with the egress packet wherein the group ID is not a part of the egress packet.

15. The network of claim 14, wherein a rule that is associated with a first group of host machines matches any egress packet that is also associated with the first group of host machines.

16. The network of claim 14, further comprising a group identifier (ID) memory having stored therein the group ID associated with the egress packet,
wherein each of the plurality of rules is associated with a group mask,
wherein a rule is selected from among the plurality of rules by combining the rule's group mask with the group ID in the group ID memory.

17. The network of claim 16, wherein the group ID in the group ID memory is determined based on addressing information contained in an ingress packet, wherein the egress packet is generated from the ingress packet.

18. The network of claim 17, further comprising one or more packet forwarding tables used to generate the egress packet from the ingress packet, wherein the group ID for the group ID memory is obtained from the one or more packet forwarding tables.

19. The network of claim 17, wherein the information is a MAC address or an IP address in the ingress packet.

* * * * *